US007266806B2

(12) United States Patent
Choi et al.

(10) Patent No.: US 7,266,806 B2
(45) Date of Patent: Sep. 4, 2007

(54) PORTLET TEMPLATE BASED ON A STATE DESIGN PATTERN

(75) Inventors: Elliot M. Choi, Lewisville, TX (US); Tina M. Lemire, Lexington, KY (US); Martin L. Miller, III, Georgetown, KY (US); William P. Shaouy, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 10/790,913

(22) Filed: Mar. 2, 2004

(65) Prior Publication Data

US 2005/0198615 A1 Sep. 8, 2005

(51) Int. Cl.
*G06F 9/44* (2006.01)

(52) U.S. Cl. .................. 717/108; 717/107; 717/109; 717/116

(58) Field of Classification Search ................ 717/108
See application file for complete search history.

(56) References Cited

OTHER PUBLICATIONS

Hanis et al., "Applying the State Pattern to WebSphere Portal Portlets", IBM, Dec. 11, 2002.*

Hepper et al., "Introducing the Portlet Specification", JavaWorld, Aug. 2003.*

Hesmer et al., "Portlet Development Guide", First Edition, IBM, Oct. 25, 2001.*

Jacobson et al., Object-Oriented software Engineering A Use Case Driven Approach, Reprinted 1994, Published by Addison-Wesley, pp. 56-68.*

* cited by examiner

*Primary Examiner*—Tuan Dam
*Assistant Examiner*—Zheng Wei
(74) *Attorney, Agent, or Firm*—Schmeiser, Olson & Watts; John R. Pivnichny

(57) ABSTRACT

A method for designing object-oriented software for implementing portlets, and an associated computer system and computer program product. The portlets are available to a user of the software who clicks on a link of a first page to identify an action object of an Action class and a state object of a State class. The software includes the State class, the Action class, and program code. The State class includes a method for displaying a view of a page. The Action class includes an actionPerformed method for performing an action and a setState method for setting the state object into the session. The program code is adapted to execute: the actionPerformed method of the action object to perform the action; the setState method of the second page.

18 Claims, 14 Drawing Sheets

*FIG. 1*
*RELATED ART*

Portlet Base Source (Part A)

```
public class BasePortlet extends MVCPortlet {
.
.
.
/*******************************************************
*     Public Method Name: actionPerformed
*
*     Purpose:
*         This method is the action listener. It is
*         responsible for processing the information
*         that the user has entered in the portlet.
*
*     @param ActionEvent
*         Event which represents the specific user
*         action
*
*     @return none
*
*     @throws PortletException
*******************************************************/
public void actionPerformed(ActionEvent event) throws
PortletException {

//   Pull the portlet request out of the event.
    PortletRequest request = event.getRequest();

try {
        //   If we don't have a request, I think
        //   something is really wrong.  We
        //   log an error.
        if (request == null) {
            throw new Exception(
                "In "
                    + this.getClass().getName()
                    + ".actionPerformed(), request is
                    null.");}

// Execute the perform action method for the event
        Action action = (Action) event.getAction();

action.actionPerformed(
            baseClassService,
            request,
            getPortletConfig());
```

*FIG. 5A*

Portlet Base Source (Part B)

```
            // Set the default state for this action.
            action.setState(request);
    } catch (Exception e) {

//  Rethrow PortletExceptions
            if (e instanceof PortletException) {
                throw (PortletException) e;
            }

//  Defer all other Exception handling
            postActionException(request, e);
        }
        super.actionPerformed(event);
    }
    .
    .
    .
} //end Class
```

*FIG. 5B*

Template Controller and Base Controller Source (Part A)

```
public class BaseController extends AbstractMVCController {
.
/******************************************************
*    Public Method Name: service
*    Purpose:
*       This method is the method which is called when
*       the user selects to view the portlet. It is
*       responsible for rendering appropriately.
*
*    @param PortletRequest
*          Portlet request.
*    @param PortletResponse
*          Portlet response from view.
*    @return none
*    @throws PortletException
*    @throws IOException
******************************************************/
public void service(PortletRequest request,
PortletResponse response)
   throws PortletException, IOException { try {
    // Handle deferred exceptions
    processActionException(request);

// Get the portlet state object from session, if
    // not there get the initial state for the mode.
    PortletSession session = request.getPortletSession();
    State nextState =
       (State) session.getAttribute(
          request.getMode().toString() +
          State.STATE_OF_WORKFLOW);
    if (nextState == null) {
       nextState = getInitialState(request.getMode());
       request.getPortletSession().setAttribute(
          request.getMode().toString() +
          State.STATE_OF_WORKFLOW, nextState);
    }
    // Dispatch to state
    nextState.performView(
        baseClassService,
        request,
        response,
        getPortletConfig());
  } catch (Exception e) {

// Display any generated exceptions
    displayException(request, response, e);
```

*FIG. 6A*

Template Controller and Base Controller Source (Part B)

```
      }
    }
  }
} //end Class public class TemplateControllerForHtml extends
BaseController
.
{/***********************************************
 *    Purpose:
 *         Below API method are handled as states.
 *
 *    @param PortletRequest
 *    @param PortletResponse
 *
 *    @return none
 *
 *    @throws PortletException
 *    @throws IOException
 ***********************************************/
public void doConfigure(PortletRequest request,
PortletResponse response)
    throws PortletException, IOException {
      service(request, response);
} public void doEdit(PortletRequest request, PortletResponse
response)
      throws PortletException, IOException {
      service(request, response);
} public void doHelp(PortletRequest request, PortletResponse
response)
      throws PortletException, IOException {
      service(request, response);
} public void doView(PortletRequest request, PortletResponse
response)
      throws PortletException, IOException {
      service(request, response);
}
.
} //end Class
```

*FIG. 6B*

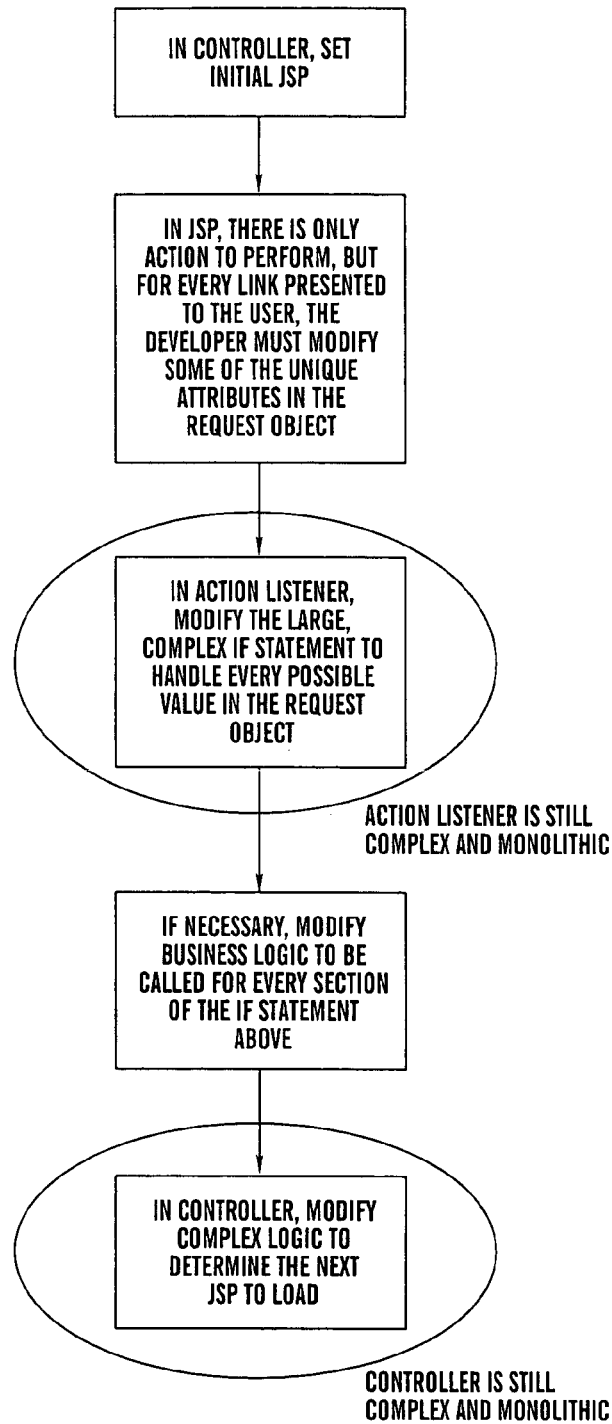
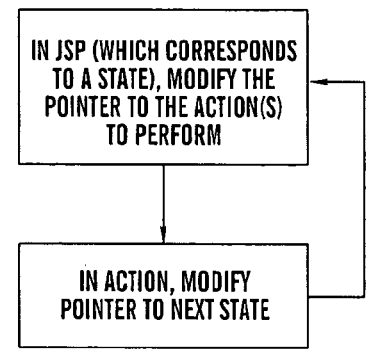
FIG. 9B
FIG. 9A

PORTLET TEMPLATE BASED ON A STATE DESIGN PATTERN

BACKGROUND OF THE INVENTION

1. Technical Field

The present invention relates to a method for designing object-oriented software for implementing portlets of a portal, and further relates to an associated computer system and computer program product.

2. Related Art

A portal is a web site that serves as a starting point to access information and applications on the internet or from an intranet. FIG. 1 provides a portlet example, in accordance with the related art. A portal has an associated portal server such as, inter alia, a WebSphere® portal server from the International Business Machines Corporation (hereinafter, a "WSP server").

Portlets are reusable components of a portal that provide access to web-based content, applications, and other resources. Web pages, applications, and syndicated content feeds can be accessed through portlets. From a user's perspective, a portlet is a window in the portal that provides a specific service or information. From an application development perspective, portlet code comprises pluggable modules that are designed to run inside a portlet container of a portal service. A Model-View-Controller (MVC) portlet is a portlet whose design separates out controller logic, business logic, and view logic from each other.

The traditional mode of Model-View-Controller (MVC) portlet development has significant disadvantages. When developing business logic, a portlet developer needs to also write a substantial amount of "overhead code" that addresses the intent of a user's request before getting to business logic. Monolithic portlet action event handling and controller code blocks need to be written to accept the user's action (e.g., the user's clicking on a link), perform numerous string comparisons to map the action to a behavior, and then navigate to the controller where the next page will be configured for display based on the results of the action. The controller likewise performs numerous string comparisons to determine the page to display. String comparisons further complicate the portlet and introduce risks of errors. With traditional MVC development, code development by the portlet developer is complex and subject to program bugs.

Thus, there is a need for portlet development technology which overcomes the aforementioned disadvantages of the MVC portlet development

SUMMARY OF THE INVENTION

The present invention provides a method for designing object-oriented software for implementing portlets of a portal, said portlets adapted to be available to a user of the software during a session in which the user clicks on a link of a first page to identify an action object of an Action class and a state object of a State class, said method comprising:

including in the software a Portlet Template that comprises the State class, the Action class, and program code;

including in the State class a performView method for displaying a view of a page;

including in the Action class an actionPerformed method for performing an action and a setState method for setting the state object into the session; and adapting the program code to execute:
(a) the actionPerformed method of the action object to perform the action,
(b) the setState method of the action object to set the state object into the session, and
(c) the performView method of the state object to display a view of a second page that is associated with the action.

The present invention provides a computer system comprising a processor and a computer readable memory unit coupled to the processor, said memory unit containing object-oriented software adapted to be executed by the processor to implement portlets of a portal, said portlets adapted to be available to a user of the software during a session in which the user clicks on a link of a first page to identify an action object of an Action class and a state object of a State class;

said software including a Portlet Template that includes the State class, the Action class, and program code;

said State class comprising a performView method for displaying a view of a page;

said Action class comprising an actionPerformed method for performing an action and a setState method for setting the state object into the session;

said program code adapted to execute:
(a) the actionPerformed method of the action object to perform the action,
(b) the setState method of the action object to set the state object into the session, and
(c) the performView method of the state object to display a view of a second page that is associated with the action.

The present invention provides a computer program product, comprising a computer usable medium having computer readable object-oriented software embodied therein for implementing portlets of a portal, said portlets adapted to be available to a user of the software during a session in which the user clicks on a link of a first page to identify an action object of an Action class and a state object of a State class;

said software including a Portlet Template that includes the State class, the Action class, and program code;

said State class comprising a performView method for displaying a view of a page;

said Action class comprising an actionPerformed method for performing an action and a setState method for setting the state object into the session;

said program code adapted to execute:
(a) the actionPerformed method of the action object to perform the action,
(b) the setState method of the action object to set the state object into the session, and
(c) the performView method of the state object to display a view of a second page that is associated with the action.

The present invention provides a simple and efficient portlet development method and system which overcomes the disadvantages of the traditional MVC portlet development

BRIEF DESCRIPTION OF THE DRAWINGS

FIG. 1 depicts a portlet, in accordance with the related art.

FIGS. 5A-5B provide an example of base portlet source code, in accordance with embodiments of the present invention.

FIGS. 6A-6B provide an example of controller source code, in accordance with embodiments of the present invention.

FIG. 9A is a flow chart of the process flow without the Portlet Template for changing an existing action to cause a portlet to render the same page again and FIG. 9B is a flow chart of the process flow with the Portlet Template for changing an existing action to cause a portlet to render the same page again, in accordance with embodiments of the present invention.

DETAILED DESCRIPTION OF THE INVENTION

The detailed description which follows comprises: a discussion of aspects of object oriented programming systems pertinent to the Portlet Template based on the state design pattern of the present invention; a discussion of the Portlet Template; and a computer system for implementing the inventive Portlet Template. A Portlet Template is an object oriented software construct that includes classes and relationships among the classes as will be described infra.

Object Oriented Programming Systems

Object oriented programming systems comprise "objects". An object is a data structure and a set of operations or functions (also referred to as "methods") that can access the data structure. The data structure contains "attributes" of the data therein. The attribute may be a primitive (such as an integer or string) or an object reference which is a pointer to another object. Objects having identical data structures and common behavior can be grouped together into, and collectively identified as, a "class".

Each defined class of objects may be manifested in a number of "instances". Each instance contains the particular data structure for a particular example of the object. In an object oriented computing environment, the data is processed by requesting an object to perform one of its methods by sending the object a "message". The receiving object responds to the message by choosing the method that implements the message name, executing this method on the name instance, and returning control to the calling high level routine along with the results of the method. The relationships between classes, objects and instances are established during "build time" or generation of the object oriented computing environment, i.e. prior to "run time" or execution of the object oriented computing environment.

In an object oriented computing environment, work is accomplished by sending action request messages to an object which contains data. The object will perform a requested action on the data according to its predefined methods. Objects may be grouped into object classes which define the types and meanings of the data, and the action requests (i.e., messages) that the object will honor. The individual objects containing data are called instances of the class.

Object classes can be defined to be subclasses of other classes. Subclasses inherit all of the data characteristics and methods of the parent class. Subclasses can add additional data and methods and can override or redefine any data elements or methods of the parent class.

Figure 12:
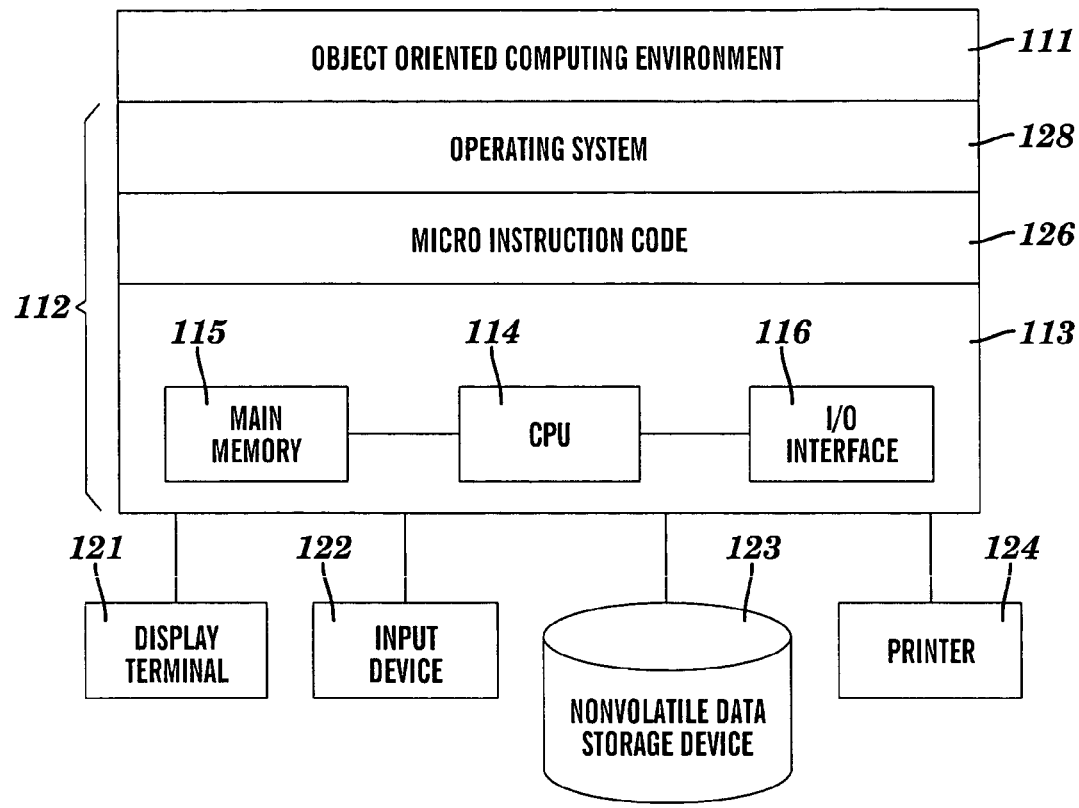
FIG. 12 depicts a hardware and software environment in which the Portlet Template of the present invention operates.

FIG. 12 depicts a hardware and software environment in which the Portlet Template of the present invention operates. In FIG. 12, an object oriented computing environment 111 operates on one or more computer platforms 112. Object oriented computing environment 111 includes an object manager. Computer platform 112 may include computer hardware units 113 such as a central processing unit (CPU) 114, a main memory 115, and an input/output (I/O) interface 116, and may further include peripheral components such as a display terminal 121, an input device 122 such as a keyboard or a mouse, nonvolatile data storage devices 123 such as magnetic or optical disks, printers 124 and other peripheral devices. Computer platform 112 may also include microinstruction codes 126 and an operating system 128. Operating system 128 may exist within the object oriented computing environment 111 and may be written in the Java object oriented programming language.

The Portlet Template

A portal is a web site having an associated portal server, wherein the portal serves as a starting point to access information and applications on the internet or from an intranet. The portal houses portlets. Portlet code comprises pluggable modules that are designed to run inside a portlet container of a portal service. The portlet code is executable code that is an object and a portlet is what the user sees on the screen. There is a class provided to portal developers called "portlet" which may be instantiated by a portal.

A Model-View-Controller (MVC) portlet is a portlet whose design separates out controller logic, data logic, and view logic from each other. The controller logic relates to the path(s) from which the data is obtained and to which the data is to be sent (e.g., web browser, PDA, wireless device). The data logic includes database queries or other business logic to gather data, and also to process data (e.g., manipulate data, perform numeric operations on the data, etc.). The view logic controls the way the processed data is presented on the device of the destination path. Thus, the controller logic specifies where to go to get the data and where to display the date after being processed, the data logic accesses and processes the data, and the view logic controls how the processed data is displayed. The controller logic, data logic, and view logic are each handled by one or more Java classes. This modularity afforded by the MVC portlet allows for multi-device capabilities of a portlet, such as web browsers, wireless devices, PDA's, etc. This modularity also eases the transition if there is a need to change the connection to a back-end database or legacy system.

A Java Server Page (JSP) is a code construct that allows developers to create dynamic page content by using Java scriptlets and static HTML to conditionally or non-conditionally output certain content and variable data to the browser. Thus, the JSP contains both the Java scriptlets and static HTML for generating a web page. The Java scriptlets and static HTML are compiled and executed on the web server, and not on the client. The JSPs may be used to generate each view of the portlet. Thus, a JSP is code that is a subset of the portlet code, wherein the JSP generates the visual page that the user sees.

Portlet modes allow a portlet to display a different user interface, depending on the task required of the portlet. Available portlet modes may include: View, Help, Edit, and Configure. The View mode is the portlet's normal mode of operation. The Help mode provides a help page for users to obtain more information about the portlet. The Edit mode provides a page for users to customize the portlet for their own needs. The Configure mode provides a page for portal administrators to configure a portlet for a user or group of users.

A state design pattern is a design pattern that allows an object to alter its behavior when its internal state changes. The object will appear to change its class. The state design pattern is a design pattern that organizes execution flow in manageable, modular chunks. Two main components in the state design pattern are states and action. A state is a stable point in time of execution where certain conditions are met. Execution stays in that stable state until an outside agent changes conditions such that execution moves to a new state. The transition from one state to the next is called an action.

Figure 1:
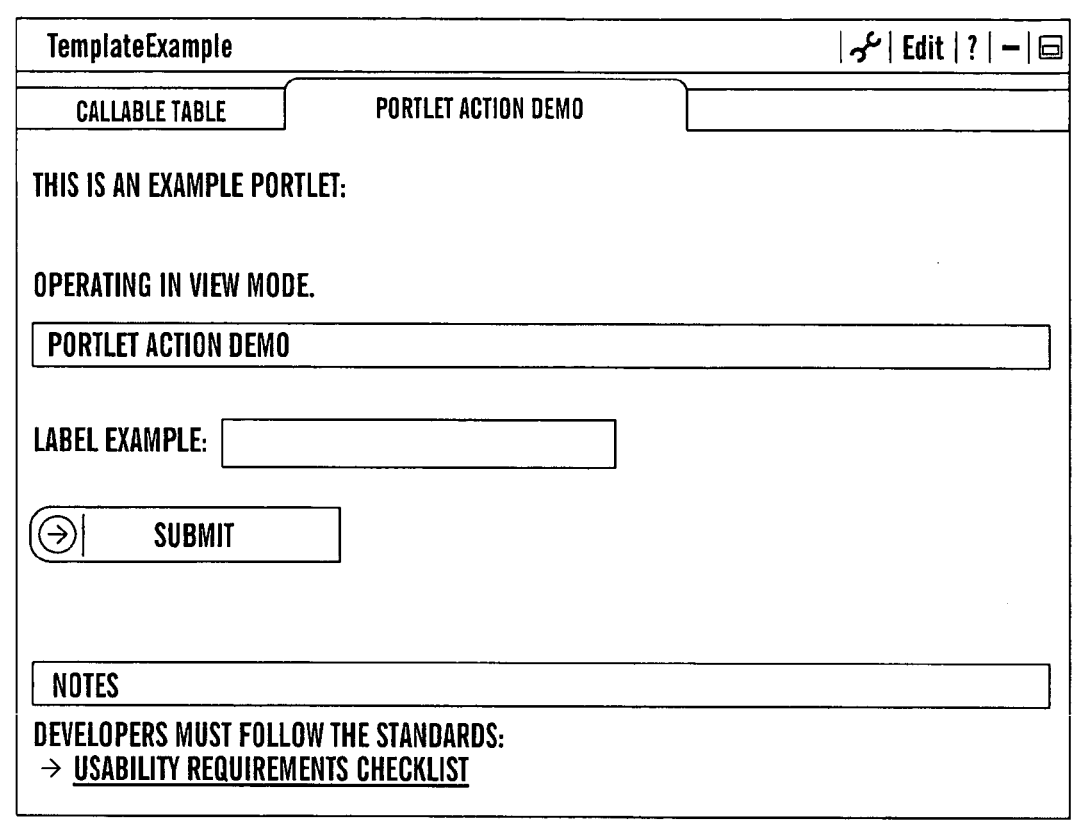

Portlet states allow a user to change how the portlet window is displayed within the portal. In a browser, users invoke these states with icons in the title bar (e.g., see FIG. 1) in the same way that applications are typically manipulated in windows of operating systems. Portlet states may include: Normal, Maximized, and Minimized. In the Normal portlet state, the portlet is arranged on the page with other portlets. When a portlet is initially constructed on the portal page, it is typically displayed in its Normal state. In the Maximized portlet state, a portlet is displayed in the entire body of the portal page, replacing the view of other portlets. In the Minimized portlet state, only the portlet title bar is displayed on the portal page with other portlets.

Portlet action events are events generated when a hypertext transfer protocol (HTTP) request is received by the portlet container that is associated with an action, such as when a user clicks a link. A portlet request is processed in two phases: Action Event Phase and a Content Rendering Phase. Portlet action events and all other portlet events are processed in the Action Event Phase via an action listener as discussed infra in conjunction with block 12 of FIG. 2. The Content Rendering Phase is where content rendering (i.e., displaying of a page) via controller should occur. The service phase is processed for each HTTP request (whether a user clicked a link or simply refreshed the page).

The present invention dislcoses a Portlet Template to simplify MVC portlet development for a large team of web developers such as, inter alia, a large team of web developers required to write a WebSphere® portal server web site. A Portlet Template is an object oriented software construct that includes classes and relationships among the classes as will be described infra in conjunction with FIG. 4. Using the Portlet Template of the present invention, the developer need not write any action event handling to accept the user's action, or to write code to perform a string comparison to map the action to a behavior. Further, the developer will not have to mesh the configuration for all JSPs in the controller.

A state design pattern is an object oriented design embedded in the Portlet Template. Using the state design pattern, the Portlet Template provides the following components to quickly and reliably create a portlet with the added benefit of allowing the developer to more easily modify code as a result of changing requirements or design: Template Java classes for states (e.g., State classes for View, Edit, Configure, and Help modes); Template Java classes for actions (e.g., Action classes for View, Edit, Configure, and Help modes); and a base portlet and base controller library (JAR) that provides a foundation and project specific standard functionality (e.g. error logging, significant event handling, etc.).

The execution flow that utilizes portal and portlet software is as follows. In a session, a JSP-produced view with links is provided to the user on a screen of a computer monitor. The user clicks on a link which implies an intended action (i.e., a business method) to be performed and a next page to be displayed following performance of said action. During the portal action event processing phase, an action listener inside the portlet code receives information (e.g., the ActionEvent parameter in the code shown in FIG. 5A) from the portal server when the user clicks on the link. The information received by the action listener from the portal includes an action object of the Action class, wherein the action object includes a business method, called actionPerformed, to be executed to perform the intended action. The portal server is able to provide this information, because the developer has previously generated code that creates the link in association with the intended action. The action listener performs the intended action by executing the actionPerformed business method in the action object. The Action class also includes a method, called setState, that sets a destination state of the State class, wherein the destination state includes a display method (which is a JSP) to be executed for displaying the next page following performance of the intended action. Next, the action listener executes the setState method which sets the destination state into the session, followed by the Content Rendering Phase phase where the execution of the controller begins. The controller extracts the destination state from the session and executes the JSP display method, called performView, that is in the destination state. Executing the performView display method generates the next page. If the user next clicks on a link on the next page, the preceding steps are repeated.

Figure 2:
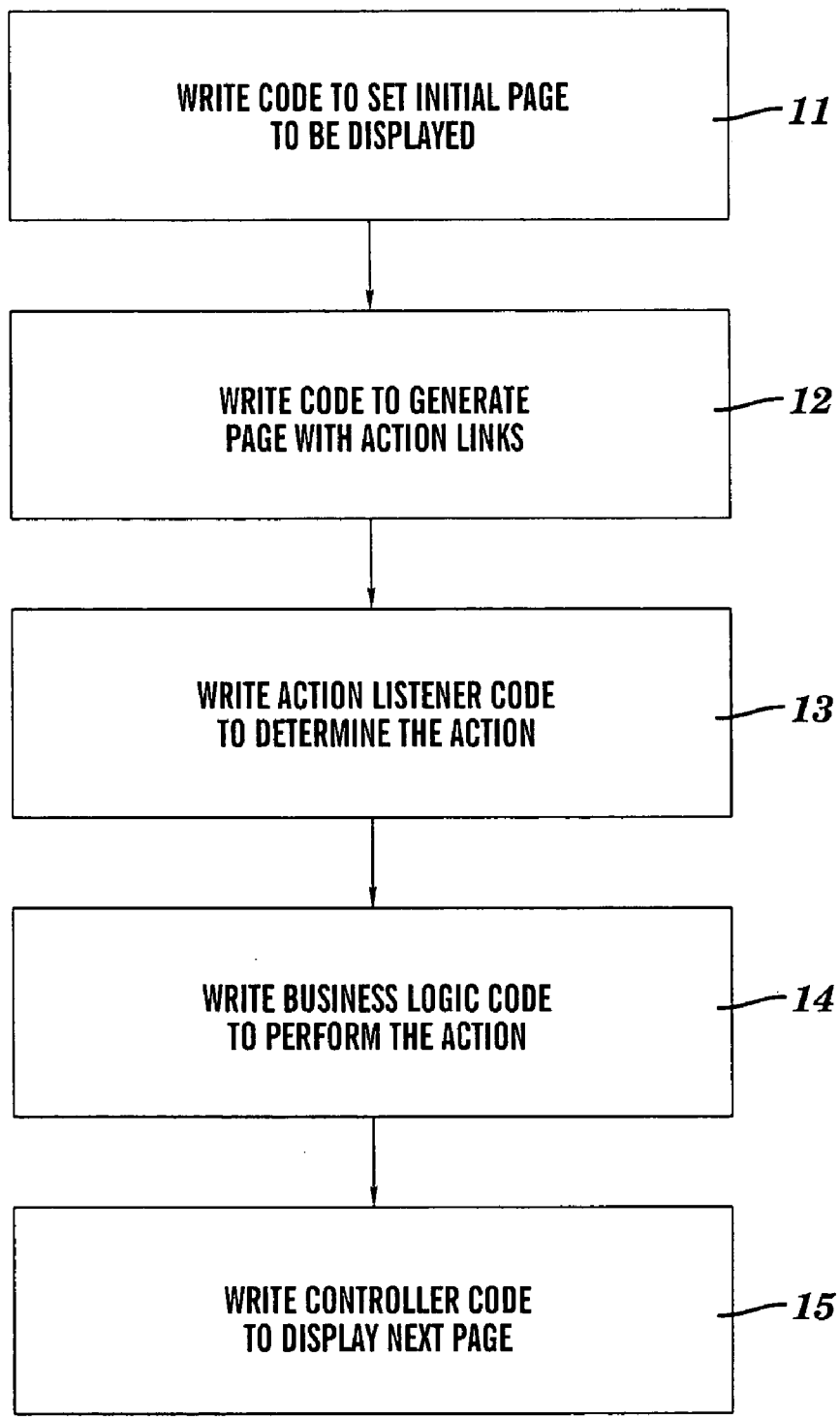
FIG. 2 is a block diagram illustrating portlet code development without the Portlet Template and FIG. 3 is a block diagram illustrating portlet code development with the Portlet Template, in accordance with embodiments of the present invention.
Figure 3:
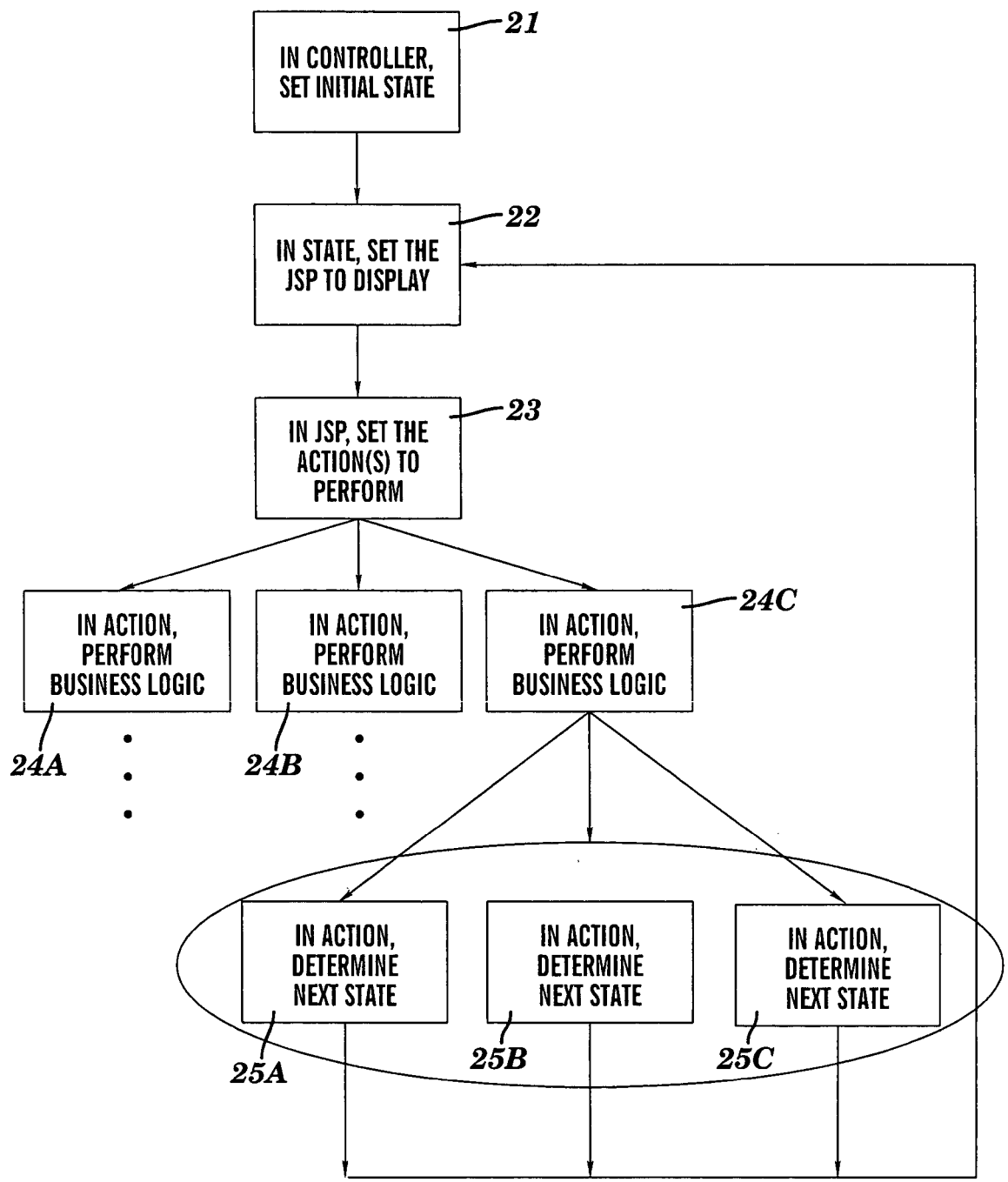

FIG. 2 is a block diagram illustrating portlet code development without the Portlet Template and FIG. 3 is a block diagram illustrating portlet code development with the Portlet Template, in accordance with embodiments of the present invention.

The block diagram of FIG. 2, which describes portlet code development without the Portlet Template, includes blocks 11-15. In block 11, the portlet developer writes code to set an initial JSP page to be displayed by the controller. In block 12, the portlet developer writes JSP code to generate a page with action links, and for every action link the portlet developer must set a unique attribute in the request object to identify the action to be performed. In block 13, the portlet developer writes action listener code to listen for an action to be performed and to determine which specific action is to be performed. The action listener code of block 13 sets up complex IF statement(s) and string comparisons to handle every possible value in the request object. In block 14, the portlet developer writes business logic code to execute the action to be performed that was identified in the listener code of block 13. In block 15, the portlet developer writes controller code to display the next page following execution of the business logic of block 14. The action listener code of block 15 includes complex logic and string comparisons to determine the next JSP page to be displayed.

The block diagram of FIG. 3, which describes portlet code development with the Portlet Template, includes blocks 21-25. In block 21, the portlet developer writes code in the controller to set an initial state as the current state. In block 22, the portlet developer writes the State classes containing perform view codes to display the J.P. page associated with the each state. In block 23, the portlet developer writes action listener code in the J.P. code to generate a page with action links, and for each action link the developer must set the action to be a specific Action class name that performs the intended action for that link. In blocks 24A-24C, the portlet developer writes the Action classes containing action performed codes to execute the business methods that perform the intended actions of the user. Note that blocks 24A-24C denote multiple business methods inasmuch as the portal may include multiple links, wherein each such link has an associated intended action (i.e., business method) to be performed. For each action performed, in blocks 25A-25C the portlet developer writes a set state method in the Action class that determines one destination state of the State class, wherein the destination state (called the "next state") includes a perform view display method to be executed for displaying the next page following performance of the intended action in step 24C. Following performance of the steps of blocks 24-25, the portlet developer would repeat the steps of blocks 23-25 for the next state and action.

The Portlet Template of the present invention is a working portlet application designed to shift focus on the work of building a portlet in two parts: actions and states. Action and State classes are markup language specific to custom fit the portlet functionality to the device used to access the portlet. An action is performed only when a user interfaces with a portlet to perform a task or set of tasks. A state may be considered the configuration for a particular markup display (JSP) within a portlet and is processed each time the page is rendered. The business logic most suitable for an Action class is that which should only be performed when the user clicks a button or link within the portlet (such as database updates and inserts, etc.). The method, actionPerformed, in the Action class is the interface to performing actions. The business logic most suitable in a State class is that which is performed each time the page is rendered (such as database queries for real-time data availability, etc.). The method, performView, in the State class is the interface to generate the markup language for the view of the state.

The present invention utilizes base classes of "Action" and "State". The portal developer writes child Action classes of the base Action class. Additionally, the portal developer writes child State classes of the base State class.

Figure 4:
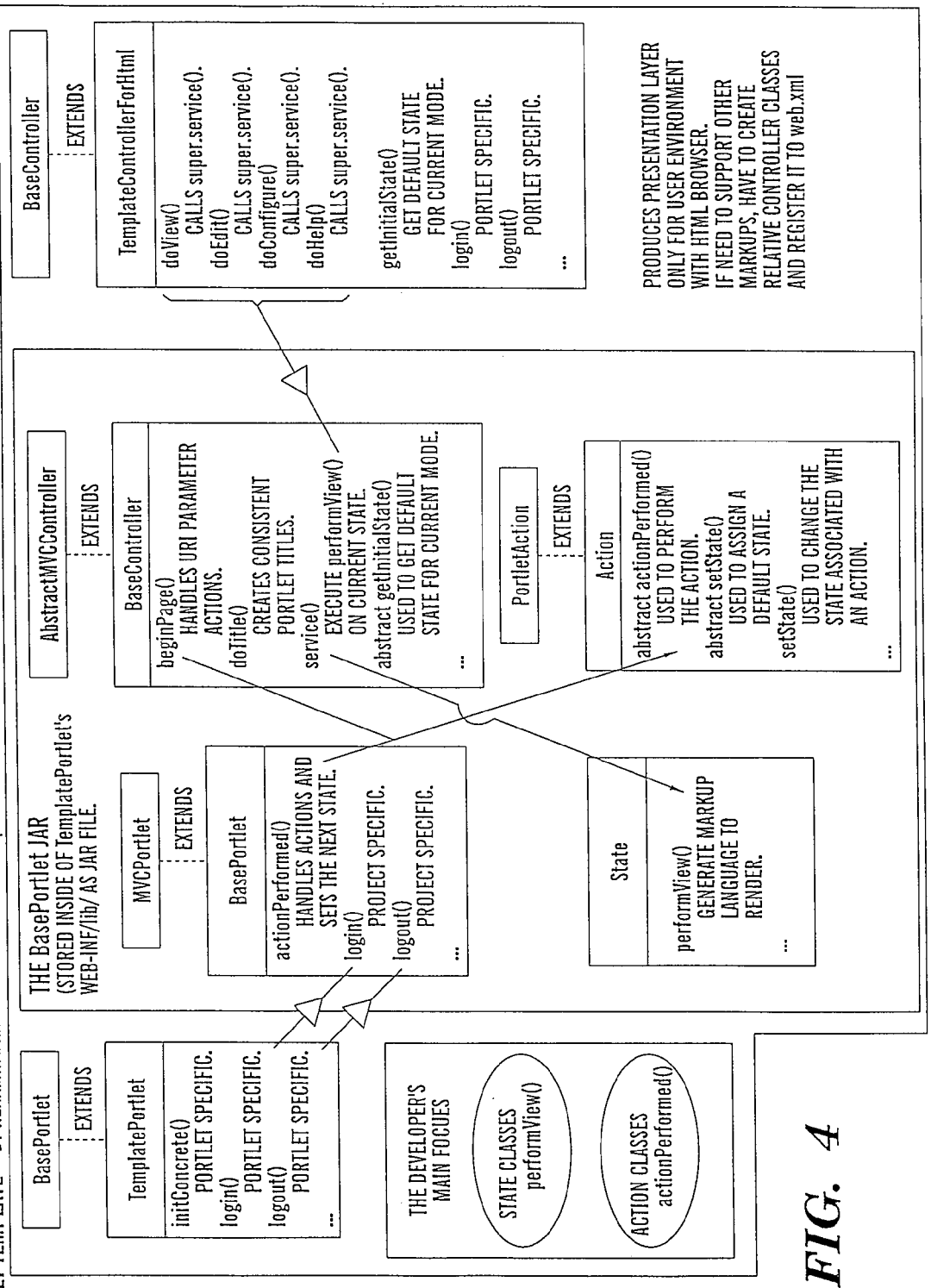
FIG. 4 depicts the layout of the Portlet Template design, in accordance with embodiments of the present invention.

FIG. 4 shows the layout of the Portlet Template design, in accordance with embodiments of the present invention. The Portlet Template is a software construct that provides a method for designing object-oriented software for implementing portlets of a portal. The Portlet Template includes a State class and an Action class as shown. The portlets are adapted to be available to a user of the software during a session in which the user clicks on a link of a first page to identify an action object of the Action class and a state object of the State class. The State class includes a performView method for displaying a view of a page. The Action class includes an actionPerformed method for performing an action and a setState method for setting the state object into the session. The Portlet Template further includes program code adapted to execute: (a) the actionPerformed method of the action object to perform the action, b) the setState method of the action object to set the state object into the session, and (c) the performView method of the state object to display a view of a second page that is associated with the action.

The program code includes a portlet code module (BasePortlet and TemplatePortlet) and a controller code module (BaseController and TemplateControllerForHtml) in the program code. The BasePortlet class of the portlet code module is adapted to execute the action performed method and the set state method, and the BaseController class of the controller code module is adapted to execute the perform view method.

The portlet code module includes a BasePortlet class and a TemplatePortlet class. The BasePortlet class does not include portlet specific methods and may include project specific methods. A "project" is an undertaking by a group of developers to develop portlets. The TemplatePortlet class is a child of the BasePortlet class and may include portlet specific methods (e.g., intConcrete, login, logout).

The controller code module includes a BaseController class and a TemplateControllerForHtml class. The BaseController class does not include portlet specific methods and may include project specific methods. The TemplateControllerForHtm is a child of the BaseController class and includes at least one portlet specific method (e.g., login, logout).

The BasePortlet class includes an action listener method in the BasePortlet class, wherein the action object results from the user clicking on the link of the first page and is communicated from the portal to the action listener method.

As shown in FIG. 4, the base portlet, base controller, State definition classes, and Action definition classes are built into a library (JAR, or Java archive file) to lock in standard project related foundation and function into the portlet. The TemplatePortlet inherits from the base portlet in the library. The actionPerformed logic is in the base portlet. The TemplateControllerForHTML inherits from the base controller in the JAR library. The do View logic is in the base controller's service method. Each do method (e.g., do View, doEdit, doConfigure, and doHelp) calls the service method in the base controller. Markup language independent logic may be implemented in the TemplatePortlet. Any markup specific logic should go into the TemplateController class to support the MVC design.

FIGS. 5A-5B (collectively, "FIG. 5") provides an example of the base portlet source code, in accordance with embodiments of the present invention. The code listed in FIG. 5B sequentially follows the code listed in FIG. 5A. In FIG. 5, the statement "Action action=(Action) event.getAction" performs the action listener function by extracting the action object from the ActionEvent input parameter, wherein the action of the action object relates to the link clicked by the user, and wherein the link was created for the action by code such the code in.

TABLE 1

```
<a href="<portletAPI:createURI>
    <stateURI:StateURIAction
    name=" myPortlet.actions.html.XYZAction " />
    </portletAPI:createURI>">My Link</a>
```

The action object extracted by the base portlet code includes an actionPerformed method for performing the action and a setState method for setting the destination state (i.e., destination state object) of the State class into the session. The destination state includes a display method (which is a JSP) to be executed for displaying the next page following performance of the action. The statement "action-.actionPerformed" executes the actionPerformed method that performs the action. The statement "action.setState (request)" executes the setState method that sets the destination state. Note that the coding in the base portlet code of FIG. 5A contains: no string comparisons, no IF statement(s) for determining the action to be performed, and no IF statements for determining the next page to be displayed.

FIGS. 6A-6B (collectively, "FIG. 6") provides an example of controller source code, in accordance with embodiments of the present invention. The controller source code in FIG. 6 includes the TemplateControllerForHtml and BaseController indicated in FIG. 4. The code listed in FIG. 6B sequentially follows the code listed in FIG. 6A. In FIG. 6, the statement "State nextState=(State) session.getAttribute " extracts the state object from the session. The destination state object includes the performView method for displaying the next page following the action performed by the actionPerformed method in the action object (see FIG. 5 and discussion supra thereof). The statement "nextState.performView" executes said performView method for displaying said next page. Note that in the coding in FIG. 6, which executes the service method in the base controller, the base controller executes the performView method only on the current state object.

Actions are added to a portlet Uniform Resource Identifier (URI), but the Actions must be instances of the Action classes written for the portlet using Portlet Template, and the action names must be the fully qualified class name (package+class, for example: "myPortlet.actions.html.StartViewAction"). The Portlet Template requires a special JSP tag library definition file to allow JSPs to generate portlet URIs with the action object specified in the action name to be added to the URI.

The Action class implements a setState method to identify to the portlet which state object should be used following the action. States are stored in the portlet session under a specific attribute name. Immediately after portlet login (or when the specific state attribute is removed from the session) the base controller's service method uses the TemplateController's getInitialState method to set a default state in the session. The TemplateControllerForHtml is not locked away in the library (JAR), so the developer has the ability to change the default states used for each portlet mode (e.g., view, edit, configure, and help).

The typical flow of a request through the Portlet Template includes a linking event, an Action Event Phase, and a Content Rendering Phase.

In the linking event, the user clicks on a link that was created using the standard portlet development Application Programming Interface (API) and the special Portlet Template JSP tag library to perform XYZAction in the example of link creation shown in Table 1, described supra.

In the portlet's Action Event Phase, the base portlet's actionPerformed method is first executed, which executes the actionPerformed method on the XYZAction object to perform whatever business logic is related to this action. Next, the base portlet executes the setState method on the XYZAction object to set the XYZState object into the session so that the XYZState object will be used in the portlet's Content Rendering Phase.

In the portlet's Content Rendering Phase, the base controller's service method is executed, which executes the performView method on the XYZState object to perform whatever business logic is related to the XYZState and to configure data to be displayed.

Figure 7:
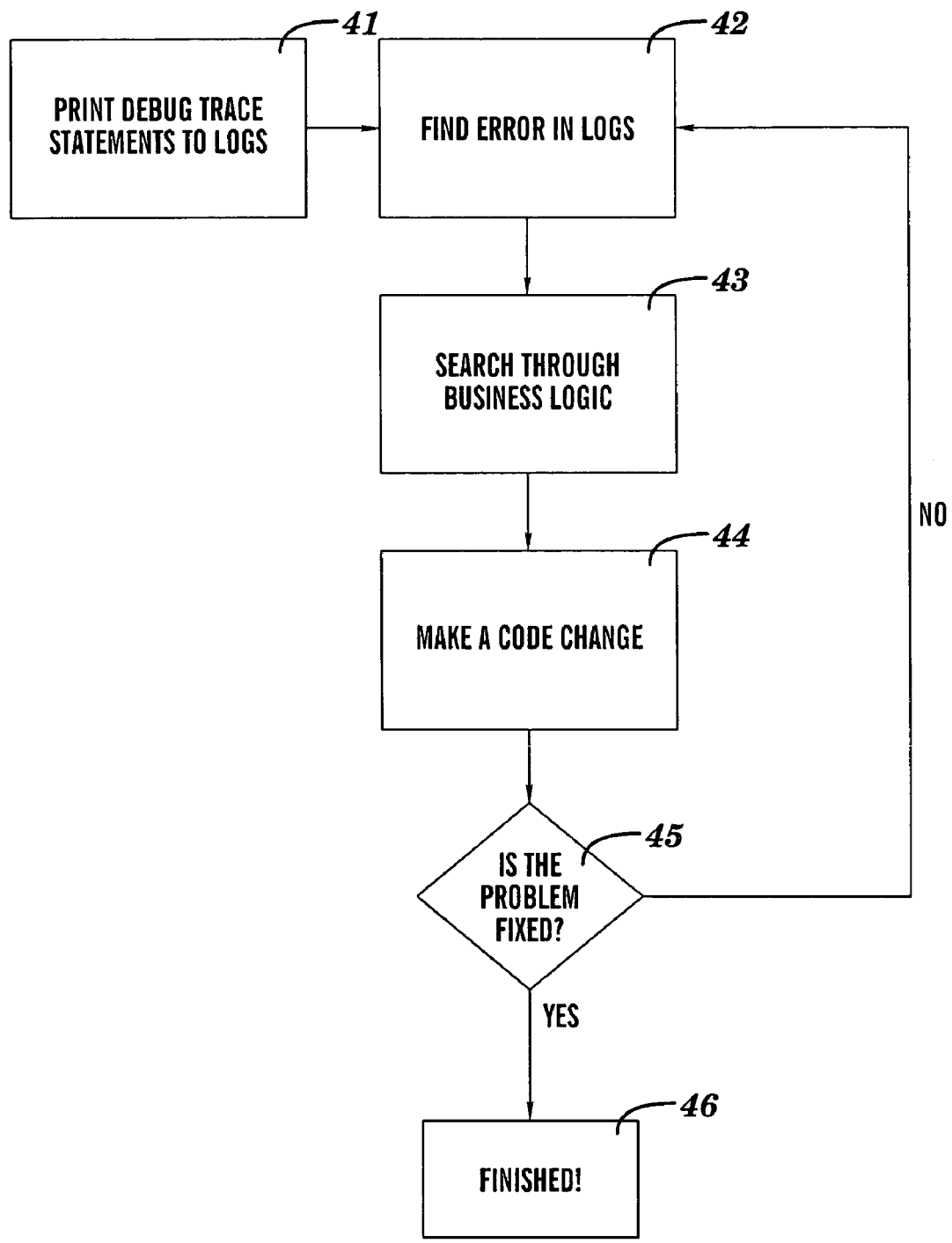
FIG. 7 is a flow chart for debugging without the Portlet Template.
Figure 8:
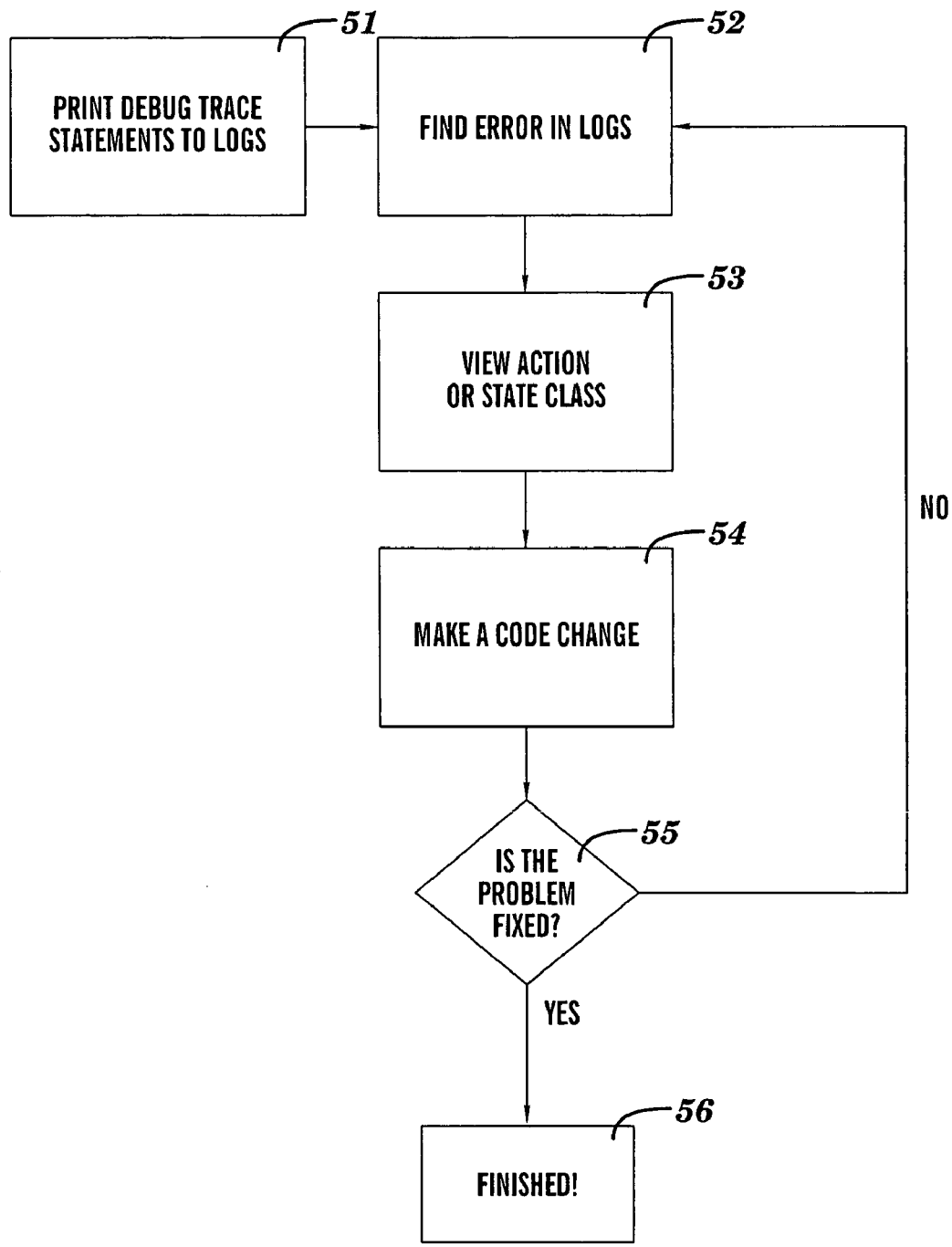
FIG. 8 is a flow chart debugging with the Portlet Template, in accordance with embodiments of the present invention.

FIG. 7 is a flow chart including steps 41-46 for debugging without the Portlet Template and FIG. 8 is a flow chart including steps 51-56 for debugging with the Portlet Template, in accordance with embodiments of the present invention.

In FIG. 7, step 41 prints debug trace statements to logs. Step 42 examines the logs to find errors in the logs relative to the trace statements. Step 43 searches through the business logic in the action listener and/or controller, using the business logic that is called in conjunction with each section of each IF statement, to find the logic relative to the error(s). The preceding searching in step 43 is inefficient and complex, and makes the action listener source code difficult to maintain in complex portlets. Step 44 makes a code change with risk of potentially damaging other action logic and/or controller logic. Step 45 determines whether the problem is fixed (i.e., whether the bug(s) have been found and removed). If step 45 determines that the problem has been fixed, then the debugging is finished in step 46. If step 45 does not determine that the problem has been fixed, then steps 42-45 are repeated in sequence.

In FIG. 8, step 51 prints debug trace statements to logs. Step 52 examines the logs to find errors in the logs relative to the trace statements. Step 53 views the specific Action or State classes for the business logic relative to the error. The Action and State classes contain specific business logic that is localized and is easier to maintain than is the complex IF statements pertaining to step 43 of FIG. 7. Step 54 makes a code change without risk of modifying other working Actions and States. Step 55 determines whether the problem is fixed (i.e., whether the bug(s) have been found and removed). If step 55 determines that the problem has been fixed, then the debugging is finished in step 56. If step 55 does not determine that the problem has been fixed, then steps 52-55 are repeated in sequence.

Thus in FIG. 7 without the Portlet Template, debugging requires cycling through all of the IF tests to determine where the bug is. In contrast, in FIG. 8 with the Portlet Template, debugging is relatively efficient and simple and is characterized by focusing on the Action and State classes inasmuch as the relevant code is localized in the Action and State classes.

FIG. 9A is a flow chart of the process flow without the Portlet Template for changing an existing action to cause a portlet to render the same page again and FIG. 9B is a flow chart of the process flow with the Portlet Template for changing an existing action to cause a portlet to render the same page again, in accordance with embodiments of the present invention. As seen in FIG. 9A, the task of changing an existing action to cause the portlet to render the same page again is a hassle without the Portlet Template. Without the Portlet Template, more attributes would usually be added to the request to signal to the controller to render the same page, adding more complexity. With the Portlet Template as shown in FIG. 9B, no operations are performed in the setState method of the Action class. The state object employed to render the previous view will still be in the session and will be used again to render the next view.

Figure 10:
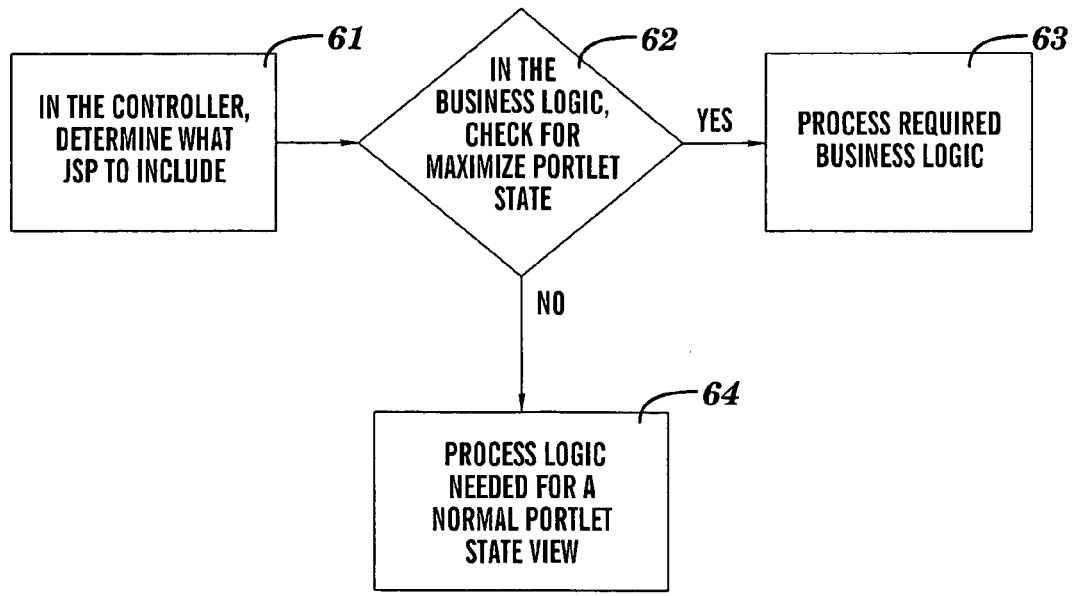
FIG. 10 is a flow chart without the Portlet Template for conditionally changing the page or state of the portlet in Maximize portlet state vs. Normal portlet state
Figure 11:
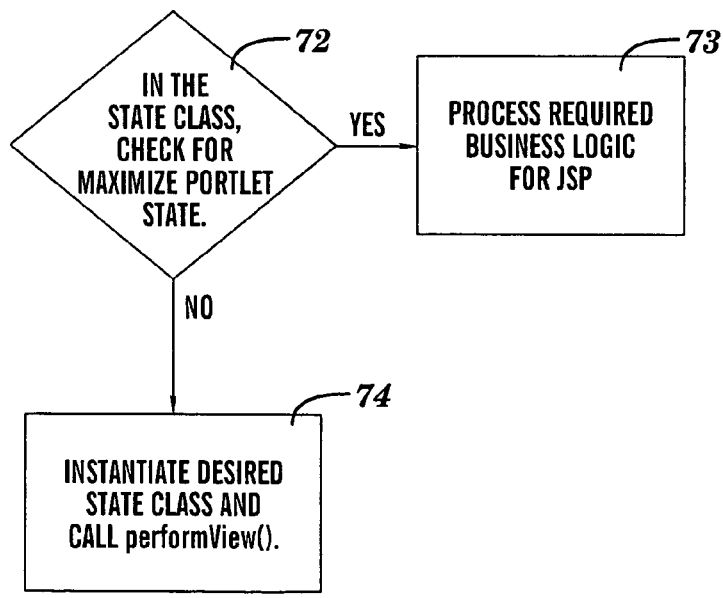
FIG. 11 is a flow chart with the Portlet Template for conditionally changing the page or state of the portlet in Maximize portlet state vs. Normal portlet state, in accordance with embodiments of the present invention.

FIG. 10 is a flow chart without the Portlet Template for conditionally changing the page or state of the portlet in Maximize portlet state vs. Normal portlet state, and FIG. 11 is a flow chart with the Portlet Template for conditionally changing the page or state of the portlet in Maximize portlet state vs. Normal portlet state, in accordance with embodiments of the present invention.

The flow chart of FIG. 10, which illustrates conditionally changing the page (or state) of the portlet without the Portlet Template, includes steps 61-64. This process flow shows how a Maximized view can be changed when the user Normalizes the portlet, without using the Portlet Template. In step 61, the controller has code that determines what JSP to include. Step 62, at the top (i.e., beginning of) the business logic for the JSP determined in step 61, checks for the Maximize portlet state. If the check for the Maximize portlet state in step 62 is positive (i.e., "Yes"), then step 63 is next executed. Step 63 processes the required business logic for the JSP and includes the JSP. If the check for the Maximize portlet state in step 62 is negative (i.e., "No"), then step 64 is next executed. Step 64 processes the logic for a Normal portlet state view, and includes a JSP that would fit in the Normal state. The kind of flexibility inherent in steps 61-64 adds substantial complexity to an already difficult to maintain and complex controller.

The flow chart of FIG. 11, which illustrates conditionally changing the page (or state) of the portlet with the Portlet Template, includes steps 72-73. This process flow shows how a Maximized view can be changed when the user Normalizes the portlet, with use of the Portlet Template. Step 72, in the State class, at the top (i.e., beginning of) the business logic for the JSP, checks for the Maximize portlet state. If the check for the Maximize portlet state in step 72 is positive (i.e., "Yes"), then step 73 is next executed. Step 73 processes the required business logic for the JSP and includes the JSP. If the check for the Maximize portlet state in step 72 is negative (i.e., "No"), then step 74 is next executed. Step 74 instantiates the desired State class (which is a different State class than the State class in step 72) and calls performView( ) method of the desired State class. Since State classes contain specific logic for their own views, control of the view can be forwarded to other states by calling performView( ) of a different State class. The kind of flexibility inherent in steps 72-74 is not limited to portlet state handling but could also be used for error handling or other event handling.

Thus in accordance with FIG. 11, a state may include more than one JSP. For example, assume that a page has a lot of information therein and that the page is in Maximize mode which facilitates seeing all the information on the page. However, if the user clicks to make the window smaller, it may be undesirable to cram all of that information in that smaller window. Therefore, it would be advantageous to include a different JSP to show a smaller version of the window. The logic for doing this is in a State class if the Portlet Template is used. Without the Portlet Template, not only would it be required to find which JSP to show, but it would also be required to instruct the controller to show a certain JSP when the state is normalized to the Normal state. Thus with the Portlet Template, there is a different State class for a Normalized view as opposed to a Maximized view. Once the State class is identified, the view is identified as a Maximized view or a Normalized view. Inside the State class, if it can be detected whether it is Maximize or Normal, it is easy to show a different JSP. Each state can include two JSPs: one for Maximize version of the state, and the other is a Normalized version of the state (i.e., it is the same state, but a different view can be shown). For most states there is only one JSP, since it is not material whether the view is Maximize or Normal. But there can be two different version of the JSP (for Maximize and Normal) in the state. Accordingly, there is control of whether the view is Maximize or Normal merely by changing states.

Thus with FIG. 11, a first object of the State class includes a first performView method for displaying a first portlet state of a page, and a second object of the State class includes a second performView method for displaying a second portlet state of the same page. For example, the first and second portlet states may each be Normal portlet state, a Maximized portlet state, or a Minimized portlet state, such that the first and second portlet states are different portlet states.

To further improve the productivity of portlet code development, the TemplatePortlet and TemplateControllerForHtml can be stubbed with comments documenting how a developer may implement a portlet specific task that may be common for some portlets in the project (such as registering significant events). A developer can load a Portlet Template implementation into an Integrated Development Environment (IDE) such a WebSphere® Application Developer (WSAD), rename classes to names more descriptive to the function of the portlet (rather than having the name Template in the class names), change the UID in web.xml so the portlet will be unique on the portal, change the servlet and controller configuration in web.xml to the new class names, and start writing actions and states to do the work of the portlet.

Therefore, portlet developers can copy the TemplatePortlet and TemplateControllerForHtml and rename them to their customized portlets. In that manner, the portal developers already have all the code they need and all they have to do is write states and Action classes. The portal developers write The TemplatePortlet and TemplateControllerForHtml (see FIG. 4). TemplatePortlet and TemplateControllerForHtml inherit the logic from the BasePortlet and BaseController, respectively.

The Portlet Template is a working portlet application that can be customized to employ common project specific tasks or portlet specific tasks. Using the State Design Pattern separates Action and State processing into separate modules for faster and easier maintenance and readability. Portlet developers can focus on the purpose of the portlet in State and Action classes, rather than focusing on the details of building a portlet from scratch.

Computer System

Figure 13:
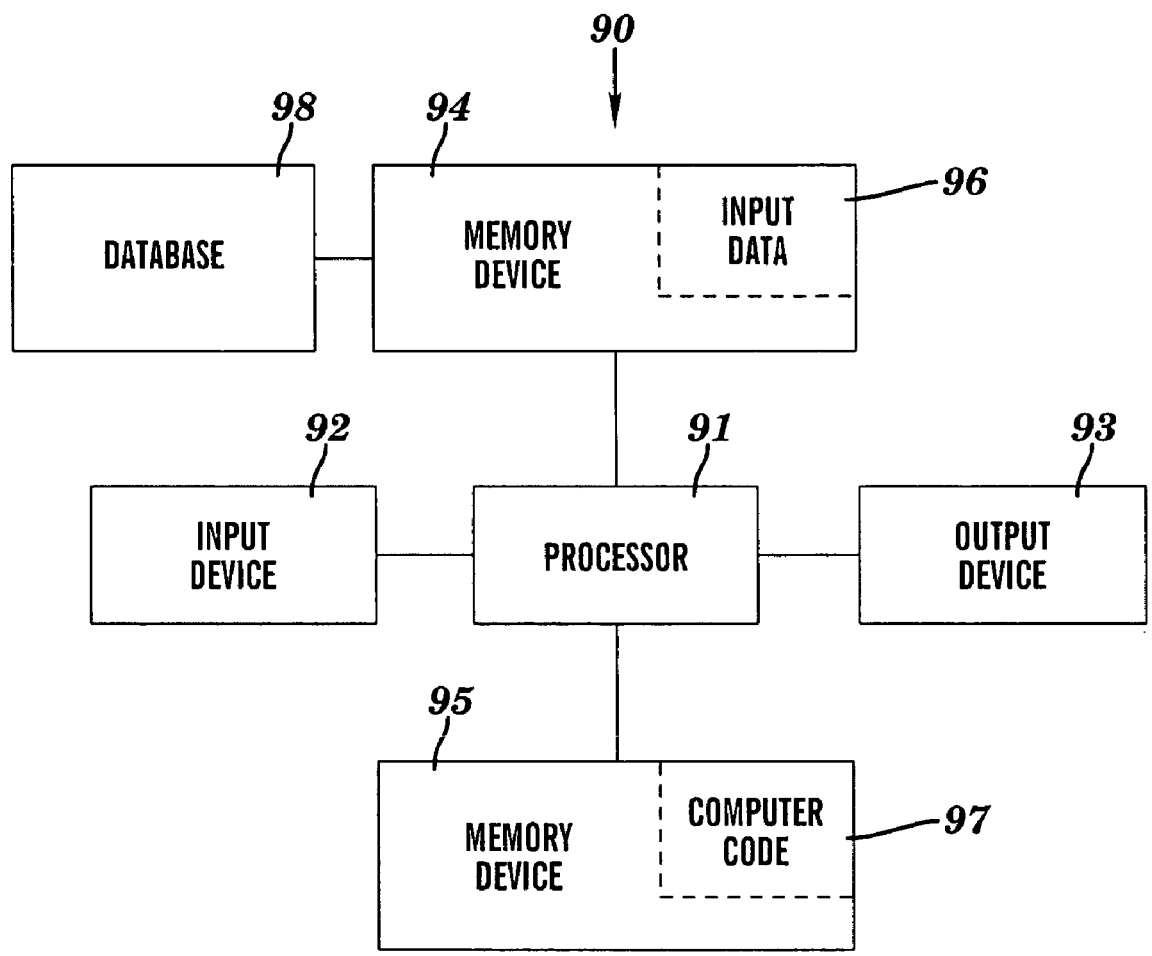
FIG. 13 illustrates a computer system used for implementing the Portlet Template of the present invention.

FIG. 13 illustrates a computer system 90 for implementing the Portlet Template of the present invention. The computer system 90 comprises a processor 91, an input device 92 coupled to the processor 91, an output device 93 coupled to the processor 91, and memory devices 94 and 95 each coupled to the processor 91. The memory devices 94 and 95 are computer readable. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithm(s) or other computer readable program code for implementing the Portlet Template of the present invention. The processor 91 executes the computer code 97. The memory device 94 includes input data 96. The memory device 94 includes or is coupled to a database 98 which may relate to the database 30 of FIGS. 2-21. The input data 96 includes input required by the computer code 97. The output device 93 displays output from the computer code 97 (e.g., the graphical interface of FIG. 13). Either or both memory devices 94 and 95 (or one or more additional memory devices not shown in FIG. 13) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 13 shows the computer system 90 as a particular configuration of hardware and software, any configuration of hardware and software, as would be known to a person of ordinary skill in the art, may be utilized for the purposes stated supra in conjunction with the particular computer system 90 of FIG. 13. For example, the memory devices 94 and 95 may be portions of a single memory device rather than separate memory devices. As another example, the hardware and software environment of FIG. 12, discussed supra, may be utilized.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for designing object-oriented software for implementing portlets of a portal, said portlets adapted to be available to a user of the software during a session in which the user clicks on a link of a first page to identify an action object of an Action class and a state object of a State class, said method comprising designing the software followed by storing the designed software in a computer usable medium from which the software may be executed on a processor of a computer system to implement portlets of a portal, said designing the software comprising:

including in the software a Portlet Template that comprises the State class, the Action class, and program code;

including in the State class a perform view method for displaying a view of a page;

including in the Action class an action performed method for performing an action and a set state method for setting the state object into the session;

adapting the program code to execute:
(a) the action performed method of the action object to perform the action,
(b) the set state method of the action object to set the state object into the session, and
(c) the perform view method of the state object to display a view of a second page that is associated with the action;

including a portlet code module and a controller code module in the program code, wherein the portlet code module and a controller code module are different modules, wherein the portlet code module is adapted to execute the action performed method and the set state method, and wherein the controller code module is adapted to execute the perform view method;

including a BasePortlet class and a TemplatePortlet class in the portlet code module, wherein the BasePortlet class does not include a portlet specific method and includes the action performed method and the set state method, and wherein the TemplatePortlet class is a child of the BasePortlet class and includes at least one portlet specific method; and including a BaseController class and a TemplateControllerForHtml class in the controller code module, wherein the BaseController class does not include a portlet specific method and includes the perform view method, wherein the TemplateControllerForHtml class is a child of the BaseController class and includes at least one portlet specific method, and wherein the BasePortlet class and the BaseController class are different classes.

2. The method of claim 1, wherein said designing the software further comprises including an action listener method in the BasePortlet class, wherein the action object resulting from the user clicking on the link of the first page is communicated from the portal to the action listener method in response to the action listener method extracting the action object from an input parameter associated with the link, wherein the extracted action object includes an action performed method for performing an action and a set state method for setting a destination of the State class into the session, and wherein the destination state includes a display method to be executed for displaying a next page following the action.

3. The method of claim 1, wherein a first object of the State class includes a first perform view method for displaying a first portlet state of a given page, wherein a second object of the State class includes a second perform view method for displaying a second portlet state of the given page, wherein the first and second portlet states are different portlet states, and wherein the first and second perform view methods are different perform view methods.

4. The method of claim 3,
wherein the first and second portlet states are each selected from the group consisting of a Normal portlet state, a Maximized portlet state, and a Minimized portlet state;
wherein in the Normal portlet state, a portlet of the portlets is arranged on a displayed portal page with other portlets of the portlets;
wherein in the Maximized portlet state, the portlet of the portlets is displayed in the entire body of the displayed portal page. replacing a view of the other portlets; and
wherein in the Minimized portlet state, only a portlet title bar is displayed on the displayed portal page with the other portlets.

5. The method of claim 1, wherein the software comprises JAVA software.

6. The method of claim 1, wherein the portal comprises a portal server.

7. A computer system comprising a processor and a computer readable memory unit coupled to the processor, said memory unit containing object-oriented software adapted to be executed by the processor to implement portlets of a portal, said portlets adapted to be available to a user of the software during a session in which the user clicks on a link of a first page to identify an action object of an Action class and a state object of a State class;

said software including a Portlet Template that includes the State class, the Action class, and program code;

said State class comprising a perform view method for displaying a view of a page;

said Action class comprising an action performed method for performing an action and a set state method for setting the state object into the session;

said program code adapted to execute:
(a) the action performed method of the action object to perform the action,
(b) the set state method of the action object to set the state object into the session, and
(c) the perform view method of the state object to display a view of a second page that is associated with the action, wherein the program code includes a portlet code module and a controller code module, wherein the portlet code module and a controller code module are different modules, wherein the portlet code module is adapted to execute the action performed method and the set state method, wherein the controller code module is adapted to execute the perform view method, wherein the portlet code module comprises a BasePortlet class and a TemplatePortlet class, wherein the BasePortlet class does not include a portlet specific method and includes the action performed method and the set state method, wherein the TemplatePortlet class is a child of the BasePortlet class and includes at least one portlet specific method, wherein the controller code module comprises a BaseController class and a TemplateControllerForHtml class, wherein the BaseController class does not include a portlet specific method and includes the perform view method, wherein the TemplateControllerForHtml class is a child of the BaseController class and includes at least one portlet specific method, and wherein the BasePortlet class and the BaseController class are different classes.

8. The computer system of claim 7, wherein the BasePortlet class includes an action listener method, and wherein the action object resulting from the user clicking on the link of the first page is communicated from the portal to the action listener method in response to the action listener method extracting the action object from an input parameter associated with the link, wherein the extracted action object includes an action performed method for performing an action and a set state method for setting a destination of the State class into the session, and wherein the destination state includes a display method to be executed for displaying a next page following the action.

9. The computer system of claim 7, wherein a first object of the State class includes a first perform view method for displaying a first portlet state of a given page, wherein a second object of the State class includes a second perform view method for displaying a second portlet state of the given page, wherein the first and second portlet states are different portlet states, and wherein the first and second perform view methods are different perform view methods.

10. The computer system of claim 9,
wherein the first and second portlet states are each selected from the group consisting of a Normal portlet state, a Maximized portlet state, and a Minimized portlet state;
wherein in the Normal portlet state, a portlet of the portlets is arranged on a displayed portal page with other portlets of the portlets;
wherein in the Maximized portlet state, the portlet of the portlets is displayed in the entire body of the displayed portal page. replacing a view of the other portlets; and
wherein in the Minimized portlet state, only a portlet title bar is displayed on the displayed portal page with the other portlets.

11. The computer system of claim 7, wherein the software comprises JAVA software.

12. The computer system of claim 7, wherein the portal comprises a portal server.

13. A computer program product, comprising a computer usable medium having computer readable object-oriented software embodied therein, said computer readable object-oriented software containing program code that when executed by a processor of a computer system implements portlets of a portal,
said portlets adapted to be available to a user of the software during a session in which the user clicks on a link of a first page to identify an action object of an Action class and a state object of a State class;
said software including a Portlet Template that includes the State class, the Action class, and program code;
said State class comprising a perform view method for displaying a view of a page;
said Action class comprising an action performed method for performing an action and a set state method for setting the state object into the session;
said program code adapted to execute:
(a) the action performed method of the action object to perform the action,
(b) the set state method of the action object to set the state object into the session, and
(c) the perform view method of the state object to display a view of a second page that is associated with the action, wherein the program code includes a portlet code module and a controller code module, wherein the portlet code module and a controller code module are different modules, wherein the portlet code module is adapted to execute the action performed method and the set state method, wherein the controller code module is adapted to execute the perform view method, wherein the portlet code module comprises a BasePortlet class and a TemplatePortlet class, wherein the BasePortlet class does not include a portlet specific method and includes the action performed method and the set state method, and wherein the TemplatePortlet class is a child of the BasePortlet class and includes at least one portlet specific methods, wherein the controller code module comprises a BaseController class and a TemplateControllerForHtml class, wherein the BaseController class does not include a portlet specific method and includes the perform view method, wherein the TemplateControllerForHtml class is a child of the BaseController class and includes at least one portlet specific method, and wherein the BasePortlet class and the BaseController class are different classes.

14. The computer program product of claim 13, wherein the BasePortlet class includes an action listener method, and wherein the action object resulting from the user clicking on the link of the first page is communicated from the portal to the action listener method in response to the action listener method extracting the action object from an input parameter associated with the link, wherein the extracted action object includes an action performed method for performing an action and a set state method for setting a destination of the State class into the session, and wherein the destination state includes a display method to be executed for displaying a next page following the action.

15. The computer program product of claim 13, wherein a first object of the State class includes a first perform view method for displaying a first portlet state of a given page, wherein a second object of the state class includes a second perform view method for displaying a second portlet state of the given page, wherein the first and second portlet states are different portlet states, and wherein the first and second perform view methods are different perform view methods.

16. The computer program product of claim 15,
wherein the first and second portlet states are each selected from the group consisting of a Normal portlet state, a Maximized portlet state, and a Minimized portlet state;

wherein in the Normal portlet state, a portlet of the portlets is arranged on a displayed portal page with other portlets of the portlets;

wherein in the Maximized portlet state, the portlet of the portlets is displayed in the entire body of the displayed portal page, replacing a view of the other portlets; and wherein in the Minimized portlet state, only a portlet title bar is displayed on the displayed portal page with the other portlets.

17. The computer program product of claim 13, wherein the software comprises JAVA software.

18. The computer program product of claim 13, wherein the portal comprises a portal server.

* * * * *